Dec. 20, 1938.  C. C. FARMER  2,140,620
HIGH SPEED BRAKE EQUIPMENT
Filed April 20, 1937   3 Sheets-Sheet 1
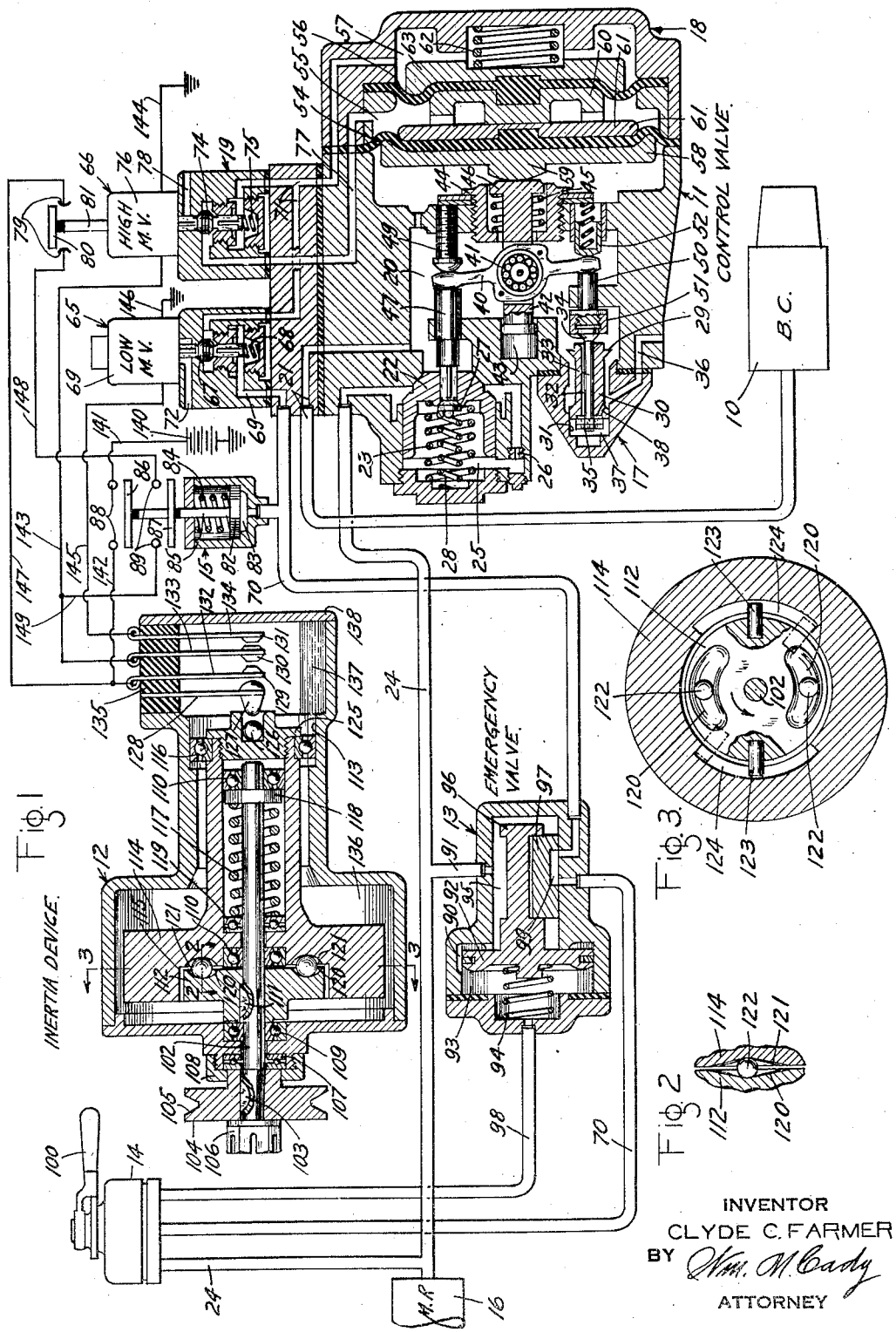
INVENTOR
CLYDE C. FARMER
BY Wm. M. Cady
ATTORNEY Dec. 20, 1938.          C. C. FARMER          2,140,620
HIGH SPEED BRAKE EQUIPMENT
Filed April 20, 1937          3 Sheets-Sheet 2
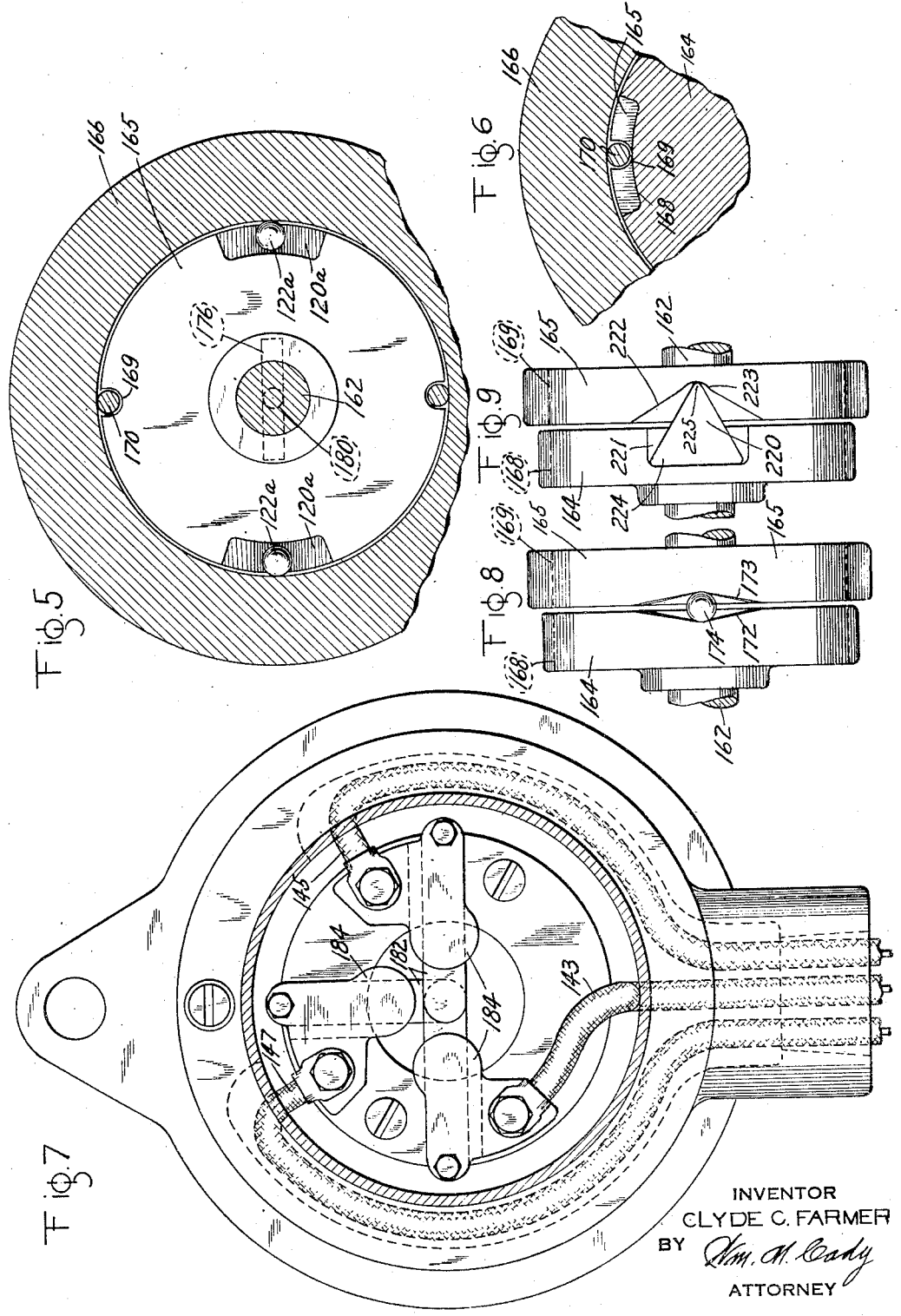
INVENTOR
CLYDE C. FARMER
BY
ATTORNEY

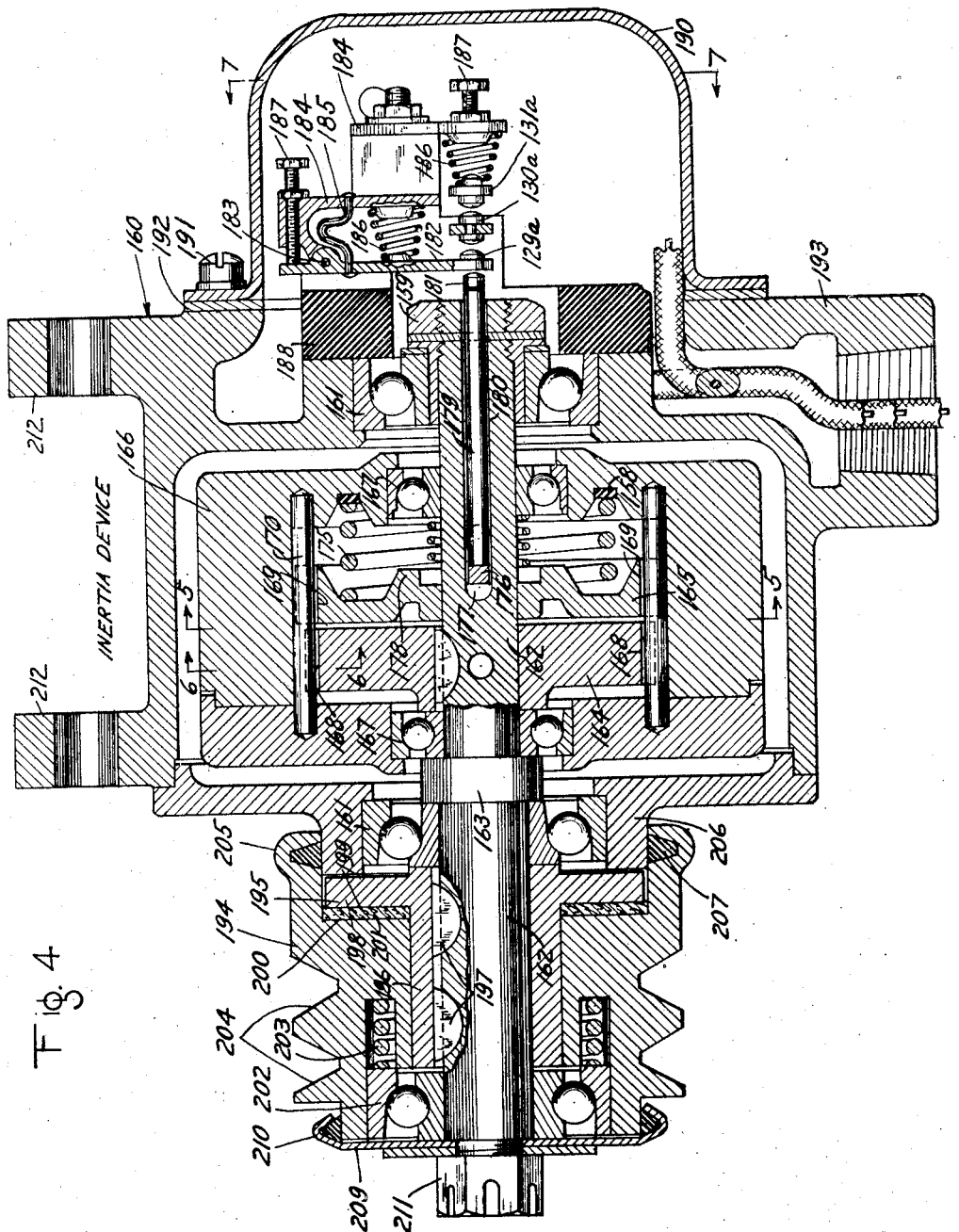

Patented Dec. 20, 1938

2,140,620

UNITED STATES PATENT OFFICE 2,140,620

HIGH SPEED BRAKE EQUIPMENT

Clyde C. Farmer, Pittsburgh, Pa., assignor to The Westinghouse Air Brake Company, Wilmerding, Pa., a corporation of Pennsylvania Application April 20, 1937, Serial No. 137,956

35 Claims. (Cl. 303—21)

This invention relates to high speed brake equipments, and more particularly to high speed brake equipments which employ apparatus for detecting and relieving wheel slipping due to application of the brakes.

A problem of first importance in operating trains intended to travel at extremely high speeds, as for example speeds in the neighborhood of one hundred miles per hour or more, is that of so controlling the application of the brakes as to prevent wheel sliding.

When the brakes are applied and the braking force on an individual wheel exceeds that permissible under the then existing adhesion conditions, the wheel will decelerate at a rate greater than the rate of deceleration of the train proper, and will, with the braking force maintained, eventually reach zero speed and thereafter slide along the rail. There is then a period during which the wheel is diminishing in speed from a speed corresponding to the speed of the train to zero speed, that is to a locked wheel condition. During this interval of time the wheel is slipping, that is, it is rolling but at varying speeds below its normal speed. The term "wheel slipping" as hereinafter used will, therefore, refer to this condition of the wheel, that is to say, a slipping wheel is one in which the wheel is still rolling, but at some speed below what will be termed train speed. The term "wheel sliding" as hereinafter used refers to a locked wheel condition.

In order to guard against wheel sliding, it is desirable that wheel slipping be detected in the incipient stage, and steps then immediately and instantly taken to release the brakes on a slipping wheel at a rate rapid enough to prevent the wheel from reaching a sliding condition, and thus permit it to return again to train speed. When the wheel returns to train speed the brakes on that wheel may again be applied so that the wheel will be effective in retarding the train.

It is a principal object of the present invention to provide a brake system employing an improved means for detecting wheel slipping in the incipient stage, and for then quickly releasing the brakes on slipping wheels fast enough to relieve the wheel slipping condition before the wheels actually begin to slide, and for thereafter reapplying the brakes on the slipping wheels as they approach train speed.

When a wheel slips due to excessive application of the brakes, its rate of deceleration is much greater than that of the train, and if the brakes on that wheel are released sufficiently rapid to arrest the wheel slipping condition, then the wheel will accelerate at an extremely rapid rate back to train speed. The rate of deceleration and rate of acceleration of the wheel under these conditions is so much greater than the rate of deceleration of the train that use may be made of this fact to detect and relieve the wheel slipping condition, as well as effect a reapplication of the brakes on the slipping wheel after it has returned to train speed. It is a further object of the present invention to provide means which operates responsive to both the rate of deceleration and rate of acceleration of a slipping wheel to relieve the wheel slipping condition, and which operates in response to a predetermined change in the rate of acceleration of the wheel, following relief of the wheel slipping condition, to effect a reapplication of the brakes on that wheel.

It is a yet further object of the invention to provide apparatus embodying the previously mentioned features, with the additional feature that any degree of reapplication of the brakes on a slipping wheel is delayed until the wheel has returned to substantially train speed.

Wheel sliding is, of course, objectionable on any type of train or vehicle, but a certain amount can be tolerated in heretofore conventional trains without danger of greatly lengthening the stop. But with the advent of extremely high speed trains, with the limited number of trucks employed in such trains, which is particularly true in the articulated type, it is highly essential that all wheels be kept rolling if reasonably short stops are to be made from high speeds. To effectively guard against wheel sliding it is desirable that wheel slipping control be provided on each axle of each truck. The means provided for this purpose must therefore be low in first cost, require only the simplest of maintenance, and be fully reliable. It is, therefore, a further object of the present invention to provide means for detecting and relieving wheel slipping which can be manufactured at low cost, which possesses a high order of reliability, and which further requires only the simplest of maintenance.

In order for a device to be effective in detecting wheel slipping in the incipient stage, and then operate fast enough to relieve the slipping condition before wheel sliding actually takes place, it must be extremely sensitive. Experience has taught that a type of device which possesses this characteristic is the type which operates on the inertia principle. That is to say, the device employs a body or bodies which operate in response to the pronounced inertia effect present when a slipping wheel decelerates at a rate appreciably greater than the rate of deceleration of the train. It is, therefore, a further object of the present invention to provide an inertia type device with parts which are actuated in the incipient stage of wheel slipping, and brake control means controlled by these parts which acts promptly enough to release the brakes at a rate sufficiently rapid to arrest the slipping of the wheels before sliding actually takes place, and which upon relief of the wheel slipping condition will function to reapply the brakes on the slipping wheels when they have substantially returned to train speed.

A yet further object of the invention is to provide means as set forth in the preceding object which will cause the reapplication of the brakes following relief of the wheel slipping condition to not exceed a degree which bears a substantially fixed relationship to the initial degree of application which produced the wheel slipping condition.

A still further object of the invention is to provide an improved type of inertia device per se, which comprises relatively few operating parts, which is of rugged design, and which may be so constructed as to require a minimum of space for installation.

Other objects and advantages of the invention, dealing particularly with the construction and arrangements of parts, will be fully appreciated from the following description, which is taken in connection with the attached drawings, wherein, Fig. 1 shows in schematic and diagrammatic form an embodiment of the invention as adapted to the head end or control car of a train.

Figs. 2 and 3 show, respectively, detail views taken along the lines 2—2 and 3—3 of Fig. 1.

Fig. 4 shows a sectional view of an improved form of inertia device which may be employed to detect and relieve a wheel slipping condition.

Figs. 5, 6 and 7 show, respectively, views taken along the lines 5—5, 6—6 and 7—7 of Fig. 4.

Fig. 8 shows in elevation a view of two of the principal rotary elements in the inertia device of Fig. 4, and the means provided to control relative rotational and axial movement therebetween.

Fig. 9 is similar to Fig. 8, showing a modification of the means provided for controlling relative rotational and axial movement between the two rotatable members.

*Embodiment of Fig. 1*

While the embodiment of Fig. 1 shows in particular the adaptation of the invention to one car in a train, it is to be understood that the invention may be adapted to succeeding cars in a train in a like manner.

In the embodiment of Fig. 1 a brake cylinder for operating a conventional type of friction brake is shown at 10, a control valve device for controlling the supply of fluid under pressure to and its release from the brake cylinder 10 is shown at 11, an inertia device for controlling the control valve device 11 is shown at 12, an emergency valve device at 13, a brake valve device at 14, a pneumatic switch device at 15, and a main reservoir at 16.

For the purpose of illustration, the brake cylinder 10 will be regarded as operating conventional brakes on the wheels of one axle. Thus if each car comprises two trucks of two axles each, there will be four brake cylinders for the entire car and a control valve device 11 for each brake cylinder.

Considering now in detail the control valve device 11, this device comprises a relay valve section 17, a diaphragm section 18, and a magnet valve section 19.

The relay valve section 17 is housed in a casing defining a pressure chamber 20, which is in constant open communication with the brake cylinder 10 by way of pipe and passage 21. For controlling the supply of fluid under pressure to the chamber 20 there is provided a main supply valve 22, urged to a seated position by a spring 23. The supply valve 22 controls the supply of fluid under pressure from a main reservoir pipe 24, and communication is established from this pipe to a chamber 25 to the left of the supply valve by way of a choke or restriction 26. The supply valve 22 is, therefore, subject on its left hand side to the combined pressure of the spring 23 and fluid in the chamber 25.

Disposed within the main supply valve 22 is a pilot supply valve 27, which is urged toward a seated position by a spring 28. So long as the pilot supply valve 27 is seated, fluid pressure is maintained in the chamber 25, but when the pilot valve is unseated fluid under pressure may flow from the chamber 25 to the chamber 20 more rapidly than to the chamber 25 from pipe 24, so that pressure of fluid in the chamber is greatly reduced.

For controlling communication between the chamber 20 and the atmosphere, there is provided a main release valve 29. The valve 29 is provided with an elongated body 30 which extends into and is slidable in a bore 31. Extending longitudinally of the body 30 is an aperture 32 and extending through this aperture is the stem 33 of a pilot release valve 34. The pilot valve seats at the right end of the aperture. The extreme left end of the stem 33 is threaded and disposed on this threaded portion are two nuts 35, which act as a stop. As may be readily observed, the pilot valve 34 and the stem 33 are movable relative to the body 30.

When the main release valve 29 is in its unseated position, as illustrated, the pressure chamber 20 is in communication with the atmosphere by way of an exhaust passage 36. When the release valve 29 is in its seated position, and the pilot valve 34 is also seated, this communication to the atmosphere is closed. If while pressure exists in the chamber 20, the release pilot valve 34 is unseated, fluid under pressure may flow past the unseated pilot valve and through the aperture 32 to a chamber 37 to the left of the main release valve body 30. This will then produce on the left end of the valve body a fluid pressure substantially equal to that acting on the right end, so that with the pressures on either end of the valve substantially balanced it may be unseated with a relatively light force applied in an unseating direction. Eventually pressure in chamber 37 will leak away through restricted port 38 and passage 39.

For operating the main supply valve 22 and the main release valve 29, and their respective pilot valves, there is provided a mechanism comprising a lever 40 pivotally mounted through ball bearings 41 on a plunger 42. The plunger 42 has one end projecting in a bore 43 in the casing, while its other end is slidable in a bushing 44. A spring 45 acts upon a flange 46 on the plunger to urge the plunger to the right.

The upper end of the lever 40 engages a different plunger 47, which slides in a bore in the casing, and one end of this plunger engages the stem of the supply pilot valve 27. An adjustable stop screw 49 provides a stop for the upper end of the lever 40 when moved to the right.

The lower end of the lever 40 is loosely attached to yet another plunger 50, also slidable in a bore in the casing, and the other end of this plunger has secured thereto a sleeve member 51 which provides a means for securing the release pilot valve 34 thereto. A spring cushioned stop 52 arrests the movement of the lower end of lever 40 when moved to the right.

Considering now the diaphragm section 18, this section is housed in a casing having suitably secured therein two diaphragms 54 and 56, which with the casing define two pressure tight chambers 55 and 57. The diaphragms 54 and 56 are of unequal effective pressure areas, the diaphragm 54 being substantially larger than the diaphragm 56. For the purpose of illustration it will be assumed that the area of the diaphragm 56 is substantially seventy-five per cent of the area of the diaphragm 54.

The diaphragm 54 is provided with a follower plate 58 having a projection 59 for engaging the right hand end of the aforementioned plunger 42.

The diaphragm 56 is provided with a follower plate 60 which engages but is unconnected to a plate 61 secured to the diaphragm 54. Two diaphragms are thus maintained in spaced relationship, and are independently movable with respect to each other. A spring 62 is interposed between a plate 63 to the right of the diaphragm 56 and the casing of the diaphragm section, so as to bias the two diaphragms to a neutral position. The spring 62 is a weaker spring than the plunger spring 45, so that the parts of the relay valve section 17 are, in the absence of fluid pressure in chambers 55 and 57, positioned as illustrated.

When fluid under pressure is supplied to either or both of the chambers 55 and 57, one or both of the two diaphragms 54 and 56 will be deflected to the left. This will shift the plunger 42 to the left, and due to the combined pressure of spring 28 and the fluid in chamber 25 acting on the supply pilot valve 27, the lever 40 will first fulcrum about its upper end and seat both the release pilot valve 34 and the main release valve 29. This will then close communication between the chamber 20 and the atmosphere. Thereafter the lever 40 will fulcrum about its lower end and first unseat the supply pilot valve 27. Fluid under pressure in the chamber 25 will then flow rapidly past the now unseated pilot supply valve 27 to chamber 20, thus greatly reducing the force effective in holding the main supply valve 22 seated. Further movement of the lever 40 to the left will then cause plunger 47 to engage the main supply valve 22 and readily unseat it, so that fluid under pressure will flow from the main reservoir pipe 24 to the chamber 20. From the chamber 20 fluid under pressure will flow by way of pipe and passage 21 to the brake cylinder 10.

If fluid under pressure is supplied to both chambers 55 and 57 and to the same degree, it will be obvious that the effective pressures on both sides of the diaphragm 56 will be the same, so that only the diaphragm 54 will be effective in controlling the degree of brake cylinder pressure. Therefore, when brake cylinder pressure, and consequently that in chamber 20, becomes equal to the pressure in chamber 55, the plunger spring 45 will shift the plunger 42 to the right until the supply valve 22 and its pilot valve 27 are both seated, with the two release valves also maintained seated. The supply of fluid under pressure to the brake cylinder will then be lapped, and brake cylinder pressure will correspond to the pressure in chamber 55. It will also be apparent that brake cylinder pressure will be maintained against any leakage which takes place.

If now with the lap condition existing fluid under pressure should be released from the chamber 55, but maintained in chamber 57, the preponderant force of pressure in the chamber 20 will shift the plunger 42 to the right and thus first unseat the release pilot valve 34, and then the main release valve 29. Fluid under pressure will be released from the chamber 20 to the atmosphere until such time as the force acting on diaphragm 54 due to pressure in chamber 20 balances the force acting on diaphragm 56 due to fluid pressure in the chamber 57. The degree of brake cylinder pressure which thus results bears to the degree of pressure in chamber 57 the same relationship as the area of diaphragm 56 bears to the area of diaphragm 54, that is, for the example assumed brake cylinder pressure will now be seventy-five per cent of the pressure established with pressure in both chambers 55 and 57.

For controlling the supply of fluid under pressure to and its release from the chambers 55 and 57, the magnet valve section 19 has been provided. This section comprises two magnet valve devices 65 and 66, the former designated as "low magnet valve" and the latter as "high magnet valve".

The low magnet valve device 65 comprises a double beat valve 67 which is urged to an upper seated position by a spring 68, and which is actuated to a lower seated position upon energization of an electromagnet 69. In its upper seated position the double beat valve 67 opens communication between a passage 69, which is connected to one section of a control pipe 70, and a passage 71 which leads to the chamber 57. When the double beat valve 67 is in its lower seated position, this communication is closed and the passage 71 and chamber 57 are connected to the atmosphere by way of exhaust port 72.

The high magnet valve device 66 is also provided with a double beat valve 74 which is urged to an upper seated position by a spring 75, and which is actuated to a lower seated position by an electromagnet 76 when energized. In its upper seated position the double beat valve 74 establishes communication between the aforementioned passage 71 and a passage 77 leading to the chamber 55. In its lower seated position the double beat valve closes this communication and opens communication between the passage 77 and an exhaust port 78.

The high magnet valve device 66 is also provided with stationary contacts 79 and movable contact 80, which are out of engagement when the double beat valve 74 is in upper seated position and in engagement when the double beat valve is in lower seated position. The contact 80 is secured to and insulated from a stem 81 which is attached to and movable with the double beat valve 74.

The pneumatic switch device 15 is embodied in a casing having disposed therein a piston 82, which is subject on its lowermost side to the pressure of fluid in a chamber 83 and on its uppermost side to the pressure of a spring 84 disposed in a chamber normally at atmospheric pressure. Secured to the piston 82 is a stem 85 which has secured thereto and insulated therefrom, and from each other, two contact members 86 and 87, adapted to engage, respectively, stationary contacts 88 and 89. The spring 84 is a light biasing spring, so that at a low value of fluid pressure in the chamber 83 the piston 82 is actuated upwardly to cause the engagement of the contacts just referred to.

Considering now the emergency valve device 13, this device is embodied in a casing having disposed therein a piston 92, subject on one side to the combined pressure of fluid in a chamber 93 and that of a biasing spring 94, and on the other side to the pressure of fluid in a chamber 95 which is connected by a branch pipe 91 to the aforementioned main reservoir pipe 24.

The piston 92 is provided with a stem 96 which is recessed to receive and move coextensive with movement of the piston 92 a slide valve 97.

The chamber 93 is connected to a normally charged pipe 98, which may be a brake pipe, a safety control pipe, or other similar pipe, and so long as this pipe is charged the piston 92 will be maintained in its illustrated position, where a feed groove 90 connects the two chambers 93 and 95. Upon an emergency reduction of pressure in the pipe 98 and chamber 93, the overbalancing fluid pressure in chamber 95 will shift the piston 92 to its extreme left hand position closing the feed groove 90. This will shift the slide valve 97 from the illustrated position, where a cavity 99 establishes communication between the two sections of the control pipe 70, to a position where this communication is interrupted and the right hand section of the control pipe is opened to the chamber 95. Upon restoration of pressure in the pipe 98 and chamber 93, the piston 92 is shifted back to the illustrated position to reestablish communication between the two sections of the control pipe.

The brake valve device 14 may be of conventional design, and the type having both a rotary valve and a self-lapping valve mechanism operable by one handle is preferred. Such a brake valve is illustrated in Patent No. 2,055,460, granted September 22, 1936. As illustrated here the brake valve device is provided with a single operating handle 100 which is movable from a release position to various positions in a service application zone, and beyond this to an emergency position. As is well known, when the handle 100 is in the release position, the normally charged pipe 98 is maintained in communication with the main reservoir pipe 24, while the control pipe 70 is maintained in communication with the atmosphere. Upon movement of the handle 100 into the service application zone, fluid under pressure is supplied from the main reservoir pipe by the self-lapping mechanism to the control pipe 70 to a degree dependent upon the position of the handle in the service application zone. The self-lapping portion maintains the pressure in the control pipe against leakage so that at all times it corresponds to the brake valve handle position. While the handle is in the service application zone communication is maintained between the pipe 98 and the main reservoir pipe by the rotary valve.

Upon movement of the brake valve handle 100 to the emergency application position, communication between the normally charged pipe 98 and the main reservoir pipe is interrupted and the pipe 98 is vented to the atmosphere at an emergency rate, while at the same time fluid under pressure is supplied to the control pipe 70 to the maximum degree possible by operation of the brake valve device.

Considering now the inertia device 12, this device is preferably housed in a casing having projecting therefrom a shaft 102 upon which is secured, as by a key 103, a driving pulley 104. This pulley is provided with an annular recess 105 for receiving a conventional type V-belt. The pulley may be held upon the shaft by a nut 106. Where the shaft 102 enters the casing a thrust roller bearing 107 is provided, and a stuffing box 108 is provided to prevent the entrance of dust and foreign matter. The shaft 102 rotates in a roller bearing 109 mounted in the casing, and in two other roller bearings 110 disposed in members to be presently described.

Rigidly secured to the part of the shaft 102 within the casing, as by keys 111, is an annular member or body 112. Loosely disposed on the shaft 102, through the aforementioned roller bearings 110, is a relatively heavy body or mass 114, which is provided with a recess 115 in one side thereof so shaped as to receive or embrace the aforementioned annular member 112. The member 114 may both rotate and move axially relative to the shaft 102, by virtue of the roller bearings 110, and similarly relative to the casing within which it is mounted by virtue of another roller bearing 116, which is slidable in a bore 113 in the casing. A spring 117 is disposed concentrically with respect to the shaft 102 and reacts between a flange 118 on the shaft and a thrust bearing 119 within the member 114, to urge the member 114 toward the member 112.

Now the right hand face of the member 112 is provided with two dished recesses 120 and the adjacent face of the member 114 is provided with two similar and complementary recesses 121. Disposed between the members 112 and 114, and resting in the aforementioned recesses, are steel balls 122. The recesses 120 and 121 are deepest near their mid-point and slope first rather abruptly and then more gradually toward their longitudinal extremities, somewhat but not precisely like an ordinary teaspoon. The balls 122, therefore, tend to assume a position in the deepest portion of the recesses. When, however, one of the members 112 and 114 is acting under a force of rotation greater by a predetermined amount than the force acting to similarly rotate the other member, the member acting under the greater force rotates relative to the other. This differential movement is limited by engagement of pins 123, radially disposed in the periphery of the member 112, with the ends of coacting slots 124 disposed on the inside periphery of the recess 115 in the member 114.

When, however, the members 112 and 114 are urged to rotate under substantially the same rotational force, or the forces of rotation differ by less than said predetermined amount, the balls 122 will remain substantially in the positions, and the members 112 and 114 will assume relative positions, as indicated in Figs. 2 and 3.

When relative rotational movement takes place between the members 112 and 114, the shifting of the adjacent recesses 120 and 121 from a position of coincidence to a position of non-coincidence produces an axial movement of the member 114 to the right, as viewed in Fig. 1, because the balls 122 must move to shallower portions of the recesses. Now the member 114 has secured to its right end a cap 125, which carries in a recess therein a steel ball 126, which upon movement of the member 114 through a predetermined distance to the right engages a button 127 of insulating material carried by a spring member 128. When the button 127 is engaged by the ball 126 and deflects the spring member 128 to the right, a contact 129 may be caused to engage a second contact 130, and upon further movement the contact 130 may similarly engage a contact 131, it being understood that contacts 129 and 130 engage first, and thereafter contacts 130 and 131 engage.

Contacts 129, 130 and 131 are carried, respectively, by spring members 132, 133 and 134, all of the spring members being supported by an insulating block 135, and thereby being insulated both from the casing of the inertia device and from each other.

When the force tending to produce relative rotational movement between the members 112 and 114 diminishes below the aforementioned predetermined value, the spring 117 will cause the two members to assume the relative position shown in Figs. 2 and 3, whereupon the contacts will assume the open positions shown in Fig. 1.

In order that the parts of the inertia device may be fully lubricated, the casing may be made oil tight and partially filled with oil as indicated at 136 and 137. Suitable filling and draining plugs may be provided as is common practice. Further, a readily removable end plate 138 may be provided adjacent the contacts, so that ready inspection and adjustment may be made.

The pulley 105 may be driven directly from a vehicle axle, or other part which rotates at vehicle speeds. Instead of a belt drive, a gear or chain drive, or other conventional drive, may be employed.

The operation of this embodiment of my invention will now be described.

Running condition

In the description which follows reference will be had only to a single vehicle, but it will be understood, of course, that the operation will be substantially the same when described in connection with a train.

When the vehicle is running under power, or is coasting, the brake valve handle 100 is maintained in the release position, so that the pipe 98 will be maintained charged, and the pipe 70 connected to the atmosphere.

With the pulley 105 of the inertia device 12 being driven at vehicle speed, and this speed being substantially constant, or varying only at a relatively low rate, the members 112 and 114 will be running in substantial synchronism. They will then assume relative positions as indicated in Figs. 2 and 3. The parts are preferably so designed that these relative positions are readily maintained for all normal rates of speed change of the vehicle itself.

The parts of the control valve device 11 will be in the positions as illustrated, so that the brake cylinder 10 will be in communication with the atmosphere, and the brakes thus fully released.

Service application of the brakes

When it is desired to effect a service application of the brakes, the brake valve handle 100 is turned into the service application zone so that communication between the pipe 70 and the atmosphere is closed and communication established between the pipe 70 and the main reservoir pipe 24. When fluid under pressure has been established in the control pipe 70 to a degree dependent upon the handle position it will be automatically lapped. Fluid under pressure supplied to the first section of the control pipe 70 flows by way of the emergency valve device 13 to the second section of the control pipe, and from thence to each of the chambers 55 and 57 in the control valve device 11, through the communications previously described.

As fluid pressure is established in the chambers 55 and 57, the relay valve section 17 of the control valve device is actuated as before described to supply fluid under pressure from the main reservoir pipe 24 to the brake cylinder 10. The degree of brake cylinder pressure will be substantially equal to the degree of pressure established in either of the two chambers, because at this time both the high and low magnet valves are deenergized so that pressure is established in both chambers to the same degree.

At a low pressure in the second section of the control pipe 70 the pneumatic switch device 15 will close both sets of its contacts. However, this will perform no function at this time, but, as will presently appear, the closing of these contacts merely conditions certain circuits so as to render the inertia device 12 effective in controlling the control valve device 11.

If now it is assumed that the wheels being braked by the brake cylinder 10 commence to slip, it will be apparent that since the shaft 102 and member 112 are driven at axle speed, these members will begin to diminish in speed at a rate of deceleration which will be considerably greater than the rate of deceleration of the car or vehicle proper. The member 114, being a relatively heavy member, will have sufficient kinetic energy stored therein so that it will tend to continue rotating at vehicle speed. This will produce the required initial differential rotative force to cause relative rotational movement between the two members 112 and 114, until the pins 123 strike the ends of the recesses 124. Since the slope of the recesses 120 and 121 becomes shallower towards their extremities, it follows that a smaller differential rotative force will maintain the members in their new relative positions. As before described, when this takes place contact 129 will first engage contact 130, and thereafter contact 130 will engage contact 131.

When contact 129 engages contact 130, the electromagnet 76 of the high magnet valve will be energized from a source of current supply, as for example a battery 140, over a circuit which includes, beginning at the battery, conductor 141, contacts 86 and 88, conductor 142, contacts 129 and 130, conductor 143, the electromagnet 76, and ground connection 144, which provides a return circuit to the grounded terminal of the battery 140.

When the high magnet valve electromagnet is energized, the double beat valve 74 is shifted to lower seated position, closing communication between the control pipe and the chamber 55, and opening communication between this chamber and the atmosphere, by way of exhaust port 78. The size of this exhaust communication is preferably made large, so that the pressure in the chamber 55 may be reduced at an extremely rapid rate.

Engagement of contact 130 with contact 131 results in energizing the electromagnet 69 of the low magnet valve 65, over a circuit which includes, beginning at contact 129, contacts 130 and 131, conductor 145, electromagnet 69, and ground return connection 146. Energization of the electromagnet 69 shifts the double beat valve 67 to lower seated position, thereby closing communication between the control pipe 70 and the chamber 57, and opening communication between this chamber and the atmosphere by way of exhaust port 72. Like the previously described exhaust communication, this communication is also made relatively large, so that the pressure in the chamber 57 will be also reduced at an extremely rapid rate. The simultaneous rapid reduction of pressure in both chambers 55 and 57 will, as will be apparent, also effect a rapid reduction of pressure in brake cylinder 10.

Therefore, with brake cylinder pressure being rapidly reduced during the time when the vehicle wheels are changing in speed from that corresponding to the speed of the vehicle toward zero speed, i. e., toward a locked wheel condition, it will be apparent that if the brake cylinder pressure is reduced fast enough the braking force on the slipping wheels will decrease sufficiently to arrest the deceleration of the wheels before a locked wheel condition is reached. It is the intention that the parts be designed to accomplish this end, so that before the slipping wheels reach a locked wheel condition, they will cease diminishing in speed, and then due to the adhesion between wheels and rails commence to accelerate in speed and quickly return to vehicle speed.

While the slipping wheels were decelerating the member 114 will remain displaced from its normal position with respect to the member 112. If, as viewed in Fig. 3, it be assumed that the shaft 102 and member 112 are rotating in a counter-clockwise direction, then while the slipping wheels are decelerating the member 114 will move with respect to the member 112 so that the pins 123 will occupy the positions as shown in dotted lines in this figure. If for convenience this is called the forward position of the member 114, then when the slipping wheels cease decelerating and commence to accelerate in speed toward train speed, it will be apparent that the member 114 will first move to its relatively neutral position, and then as the force accelerating the wheel increases will move to a new relative position where the pins 123 will occupy a position at the other extreme end of the slots 124, that is, the member 114 will be shifted to a so-called backward position. As the member 114 shifts between the forward and backward positions the contacts 129, 130 and 131 will be momentarily out of engagement, and will then reengage as the member 114 moves to the backward position.

When these contacts disengage, the electromagnet of the low magnet valve 65 only will be deenergized, because when the high electromagnet 76 was energized the contacts 79 and 80 closed, forming a holding circuit for the high electromagnet. This holding circuit comprises, beginning at the battery 140, conductor 141, contacts 86 and 88, conductor 142, conductor 147, contacts 79 and 80, conductor 148, contacts 87 and 89, conductors 149 and 143, the high electromagnet 76, and ground return connection 144. The double beat valve 74 will thus remain on its lower seat, making it impossible to resupply fluid under pressure to the chamber 55.

The momentary deenergization of the low electromagnet 69, while the member 114 is shifting from its forward to its backward position, relative to the member 112, will result in momentary resupply of fluid under pressure to the chamber 57. When the member 114 moves to its backward position, the electromagnet 69 will be reenergized and again release fluid under pressure from this chamber. Thus the brakes will be released while the slipping wheels are accelerating rapidly back to train speed.

When the slipping wheels have reached substantially train speed, the force tending to maintain the member 114 in its backward position will diminish so that the members will assume the relative positions shown in Fig. 3. When this takes place the low electromagnet 69 will again be deenergized so as to readmit fluid under pressure to the chamber 57. With the high electromagnet 76 maintained energized no pressure will exist in the chamber 55, so that the degree of brake cylinder pressure will bear to the degree of pressure in the chamber 57 (or that in control pipe 70) the same relation that the area of diaphragm 56 bears to the area of diaphragm 54. Thus for the relative areas assumed brake cylinder pressure will now be seventy-five per cent of the initial value which produced the wheel slipping. It is expected that this reduced limit for the reapplication of the brakes will prevent a reoccurrence of the wheel slipping condition. However, if wheel slipping should again occur with the brakes thus reapplied, it will be apparent that the low electromagnet 69 will again be energized to release fluid under pressure from the chamber 57, and will again supply fluid under pressure thereto when the slipping condition has been substantially relieved.

When it is desired to release the brakes, the operator turns the brake valve handle 100 to the release position, whereupon fluid under pressure is released from the control pipe 70, and consequently from the diaphragm chambers 55 and 57. The relay valve section 17 is thus operated to release fluid under pressure from the brake cylinder 10, to release the brakes.

It should be apparent that the inertia device 12 is equally effective for both directions of travel of a vehicle, and that the brakes may be graduated on or off by suitably varying the pressure in the control pipe.

*Emergency application*

When it is desired to effect an emergency application of the brakes, the brake valve handle 100 is turned to the emergency position, in which position the normally charged pipe 98 is vented to the atmosphere at an emergency rate, while at the same time fluid under pressure is supplied to the control pipe 70 to the maximum degree. The handle 100 is left in the emergency position so as to completely deplete the pressure in the pipe 98.

Upon an emergency reduction of pressure in the pipe 98, the piston 92 in the emergency valve device 13 will shift to its extreme left hand position, and open communication between the chamber 95 and the right hand section of the control pipe 70, as previously described. Fluid at main reservoir pressure will then flow to the right hand control pipe section, and from thence to the diaphragm chambers 55 and 57, just as described for a service application. From this point on the application will be subject to control by the inertia device, if wheel slipping occurs, in substantially the same manner as described for a service application.

In the event that the emergency valve device piston 92 should fail to shift to its extreme left hand position, fluid under pressure will then flow from the first section of the control pipe 70 to the second section to effect the application.

When it is desired to effect a release of the brakes following an emergency application, the brake valve handle 100 is turned to release position, where fluid under pressure is again supplied to the pipe 98, and when sufficient pressure has been established in chamber 93, piston 92 will move back to the illustrated position, and since the two control pipe sections will then be connected, the release will be effected through the brake valve device 14, as for a release following a service application.

Embodiment of Fig. 4

This embodiment deals with an improved form of inertia device which may replace the inertia device 12 of Fig. 1. The inertia device of Fig. 4 is designated in its entirety by the numeral 160, and is preferably enclosed in a casing provided with roller bearings 161 in which rotate a shaft 162. The shaft 162 is provided with a spacing collar 163 adjacent one of the bearings 161, and a retaining nut assembly 159 adjacent the other bearing 161.

Secured to and rotatable with the shaft 162 is a member 164, while loosely disposed on the shaft and slidable therealong is a second or plate member 165. The members 164 and 165 are enclosed, for compactness, by a relatively heavy body 166 which is made up of two sections coupled together, as illustrated, and disposed on and adapted to rotate relative to the shaft 162, through roller bearings 167.

The member 164 is provided with two elongated slots 168 disposed on its periphery and arranged diametrically opposite. The member 165 is provided with two smaller slots or recesses 169 also arranged diametrically opposite. The member 166 carries on the interior thereof two pins 170, each of which passes through one of the small recesses 169 on the member 165 and one of the larger recesses 168 on the member 164. It will thus be obvious that if the member 166 rotates relative to the member 164 the member 165 rotates with it, and that the degree of relative movement between members 164 and 165 is limited by the length of the slot 168.

As best shown in Fig. 8, the two members 164 and 165 are provided respectively with dished recesses 172 and 173, preferably shaped like recesses 120 and 121 of Fig. 1, and so arranged that when the two members are urged together steel balls 174 will act as a coupling between the two members, as previously described in connection with the embodiment of Fig. 1. The member 165, which is slidable along the shaft 162, is urged toward the member 164 by a spring 175. The spring 175 seats in a spring seat 158 in the heavy body 166 and exerts a yielding force on the plate member 165 to maintain it in driven engagement with the member 164.

When, however, the force urging rotation of the heavy member 166 is greater or less by a predetermined amount than the force urging rotation of the member 164, relative rotational movement will take place between members 164 and 165, and the member 165 will, due to the action of the balls 174 between the two members, move to the right against the yielding force of spring 175. As the member 165 moves to the right it carries with it an element 176, which extends transversely through a slot 177 in the shaft 162 and projects beyond the shaft a distance permitted by a flange 178 on the member 164.

The length of the slot 177 in the shaft is such that the element 176 may move a predetermined distance to the right, and in so moving it shifts a rod 179 a corresponding distance, the rod being disposed in a longitudinally extending bore 180 in the shaft 162 of slightly larger diameter than the outside diameter of the rod. The rod 179 is provided with an end portion 181 which is insulated from the remainder of the rod, and adapted to engage a contact member 182.

The contact member 182 is pivotally mounted at 183 to a base contact member 184, and is connected thereto by flexible connector 185.

A spring 186 acts between the base contact member 184 and the contact member 182 to bias the latter to the illustrated position, an adjusting screw 187 being provided to determine this biased position. The base contact member 184 is secured to an insulating block 188 carried by the casing of the inertia device.

The contact member 182 carries a contact 129a, and the arrangement just described for supporting this contact 129a is duplicated for each of two other contacts 130a and 131a, it being understood that the contacts 129a, 130a and 131a are the counterparts of the contacts 129, 130 and 131 shown in Fig. 1, and are intended to be similarly connected to the circuits shown in Fig. 1. For the purpose of conserving space the supporting members for the contacts 129a, 130a and 131a are disposed in angular relationship on the insulating block 188, as is more clearly shown in Fig. 7. In order to avoid repetition of description, the supporting members for these contacts are given like numerals.

It is to be understood that when relative rotational movement takes place between the heavy member 166 and the member 164, that contact 129a first engages contact 130a, and then contact 130a engages contact 131a in the same sequence as described in connection with the embodiment of Fig. 1.

In order to provide easy access to the contacts for the purpose of inspection and adjustment, a removable casing member 190 is provided, preferably held in place by screws 191, with an intervening gasket 192 between the removable member and the casing proper. An inside threaded lug 193 may be provided for conduit attachment, for the entrance of suitable cables comprising the conductors 143, 145 and 147 shown in Fig. 1.

Attached to the left or larger end of the shaft 162 is a pulley and clutch mechanism comprising a pulley 194 and a clutch member 195. The clutch member 195 has a sleeve portion 196 which is rigidly secured to the shaft 162, as by keys 197, and a flange portion 198 which extends radially of the sleeve portion. The flange 198 is provided with a clutch face 199, complementary to a like clutch face 200 on the pulley 194. Between the clutch faces 199 and 200 is a composition clutch plate 201. It may be preferred that the composition clutch plate be secured to one or the other of the clutch faces 199 and 200, although there is no objection to having it loosely disposed therebetween.

The pulley 194 is rotatable with respect to the sleeve 196 through the metal to metal contact shown, and with respect to the shaft 162 through roller bearings 202. A spring 203 acts upon the pulley to urge the clutch faces into frictional engagement through the plate 201.

The pulley 194 is provided with two V-grooves 204 for receiving the usual V-belt. It will, of course, be understood that instead of employing a belt drive a gear or chain drive may be employed.

Regardless of which type of drive is employed, the pulley or like member is preferably provided with an extended portion 205 for overlapping a flange 206 of the casing, with an annular seal 207 of felt or the like for closely fitting the flange 206, so as to prevent the entry of dirt or foreign matter within the casing. Similarly, at the end of the pulley or like member, a dust excluding plate 209 is preferably provided, and having a like seal 210 overlying the end of the pulley member for also excluding dirt and foreign matter. A nut and washer 211 may be employed to hold the member 209 in place, as well as to retain the roller bearing 202 in place.

The inertia device may be attached as a unit to some stationary part of the vehicle by lugs 212.

Operation of the embodiment of Fig. 4

In describing the operation of the embodiment of Fig. 4, it will be assumed that the contacts 129a, 130a and 131a are connected to the circuits of Fig. 1 exactly the same as their counterparts in Fig. 1. Further, it will be assumed that an application of the brakes has been effected, and that the wheels associated with an axle to which the pulley 194 is connected have just begun to slip.

Before the wheels commence to slip, the pulley 194, shaft 162, and members 164, 165 and 166 will have been operating in substantial synchronism. The initial tension on the clutch spring 203 will be great enough to cause the clutch faces to engage with sufficient force to transmit rotary motion from the pulley to the shaft, and other parts, so long as the vehicle is operating at a constant speed, or its speed is not diminishing or increasing at a rate greater or less than a predetermined rate. That is to say, if the vehicle is decelerating the clutch will be effective in holding the shaft 162 and pulley 194 clutched so long as the rate of deceleration does not exceed a predetermined or chosen value. The relative positions of the members 164, 165 and 166 will thus be as shown in Figs. 5, 6 and 8.

When the wheels associated with the axle begin to slip, the pulley 194 will decelerate at the same rate that the slipping wheels decelerate. A slipping wheel has, as before stated, an extremely high rate of deceleration. The shaft 162 will, however, decelerate at a rate corresponding closely to that of the vehicle proper, due to the stored energy in the heavy member or body 166. The force acting to retard the speed of the pulley 194 will cause slippage of the clutch, so that while the pulley is decelerating rapidly the speed of the shaft is maintained much higher due to the stored energy in the heavy body 166.

The clutch will, of course, exert a braking effect on the shaft 162, so that a force will be developed sufficient to rotate the heavy body 166 and member 165 relative to the member 164, and they will assume what will be termed a forward position. In moving to its forward position the member 165 will be shifted axially of the shaft 162, and thus cause contact 129a to engage contact 130a and thereafter contact 130a to engage contact 131a, to perform the operation of the control valve device as described in connection with the embodiment of Fig. 1. This will effect a rapid release of the brakes on the slipping wheels.

In the operation of the embodiment of Fig. 1, it will be remembered that when the brakes were released sufficiently for the slipping wheel to cease decelerating, they were momentarily partially reapplied while the wheels were changing from deceleration to acceleration, then released as soon as substantial acceleration began and not reapplied until near the end of the acceleration period. The interval of time between cessation of deceleration and the beginning of substantial acceleration of the wheels is an appreciable one, so that during this interval fluid under pressure is resupplied to the brake cylinder to an appreciable degree, and when acceleration begins and this fluid is again released to the atmosphere, there results a loss of fluid under pressure which in some cases may not be tolerable.

The arrangement of the parts of the device of Fig. 4 is such as to prevent this waste of fluid. During the time that the slipping wheels are decelerating at a high rate, the shaft 162 is decelerating at a relatively lower rate. The vehicle is also decelerating at a lower rate, not greatly different from that of the shaft. It follows, therefore, that before the clutch can become effective in reengaging the pulley 194 with the shaft 162, the pulley speed, and hence the speed of the wheels, must approach and equal the speed of the shaft. When this takes place, the heavy member 166 will shift from its forward position to its normal or neutral position and thereby open contacts 129a, 130a and 131a.

By properly designing the parts, these contacts may be caused to open at or just about the time the slipping wheels have reached train speed, (i. e., the speed of non-slipping wheels) so that while the body 166 will shift to its neutral or normal position, it will not go beyond this to its backward position. The brakes will thus not be reapplied to any degree until the slipping wheels have attained substantially train speed, and fluid under pressure will not be supplied to the brake cylinder between the end of the deceleration period and the beginning of the acceleration period, and then released to the atmosphere during the acceleration period. Consequently, the loss of fluid resulting with the inertia device shown in Fig. 1 is not present when the inertia device of Fig. 4 is employed.

Moreover, since the brakes are not reapplied until the slipping wheels have attained substantially train speed, the danger of a reoccurrence of wheel slipping is greatly minimized.

In all other respects the operation of the inertia device of Fig. 4 in controlling the operation of the control valve device 11 of Fig. 1, is substantially as described in connection with the embodiment of that figure.

Embodiment of Fig. 9

This embodiment deals with the substitution of a triangular member or block 220 for each of the balls 174 in the embodiment of Fig. 4. As is readily seen in Fig. 9, the member 164 is provided with a rectangular recess 221 in place of the dished recess 172 of Fig. 8, while the member 165 is provided with a V-shaped recess 222, with the apex of V rounded somewhat as shown at 223.

When the members 164 and 165 are rotating in substantial synchronism, the block 220 will be positioned as shown. It will be noted that the base of the block rests flatly upon the base of the slot 221. When now the member 165 is urged forwardly or backwardly of the position shown in Fig. 9, with respect to the member 164, the block 220 will fulcrum about one of its base corners, and cause the member 165 to slide axially of shaft 162. Due to the fact that the block is triangular in shape the initial force required to tilt the block will be relatively great, while the force required to continue the tilt will reduce as the side between the tilting corner and the point engaging the V-portion 223 approaches parallelism with the center line of the shaft 162.

That is to say, if the block 220 is tilting about its base corner 224, then as the corner 225 is shifted toward a horizontal line passing through the corner 224, the force required to move the member 165 relative to the member 164 diminishes. The shaft 162 must, therefore, tend to decelerate at a rate greater than a predetermined rate before the member 165 can be caused to shift relative to the member 164, but once it has shifted it readily moves to its forward or backward position without delay. This is particularly advantageous in that as the slipping wheel decreases in speed, the rate of decrease will undoubtedly diminish as the brake cylinder pressure is reduced, so that the force active in maintaining the member 165 in its shifted position diminishes. With either of the constructions of Figs. 1, 4 or 9, once the relatively shiftable member has shifted to either its forward or backward position it will remain there until the differential rotative force acting on it diminishes to a value much lower than that which produced the shift.

From the foregoing description of several embodiments of my invention, it will be seen that I have provided means for detecting wheel slipping in the incipient stage, and for immediately and instantly releasing the brakes on the slipping wheels at a rate sufficiently rapid to arrest the wheel slipping condition before wheel sliding actually takes place, and for then reapplying the brakes to a limited degree, lower than the initial degree, when the slipping wheels have substantially attained train speed.

It will be apparent that many modifications and changes may be made in the apparatus shown, and I do not, therefore, desire to be limited to this specific apparatus or other than according to the appended claims.

Having now described my invention, what I claim as new and desire to secure by Letters Patent, is:

1. In a vehicle brake system, in combination, means for effecting an application of the brakes, inertia operated means responsive to an incipient stage of wheel slipping for quickly effecting a release of the brakes on the slipping wheels at a rate sufficient to arrest the wheel slipping condition and thus permit the slipping wheels to increase in speed toward that corresponding to vehicle speed, and operable as said wheels increase in speed to effect a reapplication of the brakes on said wheels, and means for limiting the degree of the reapplication to a value bearing a substantially fixed ratio to the degree which produced the wheel slipping condition.

2. In a vehicle brake system, in combination, means for effecting an application of the brakes, an inertia operated device operable in one manner in response to an incipient stage of wheel slipping and operable in another manner following arresting of the wheel slipping condition, means responsive to operation of said device in said first manner for effecting a release of the brakes on the slipping wheels at a rate sufficiently rapid to arrest the wheel slipping condition and thus permit the slipping wheels to increase in speed toward that corresponding to vehicle speed, and means operative in response to the return of said device to its normal condition following operation of said device in said second manner for effecting a reapplication of the brakes to a degree which bears a fixed relation to the initial degree which produced the wheel slipping condition.

3. In a vehicle brake system, in combination, a brake cylinder for operating the brakes on vehicle wheels, means for effecting a supply of fluid under pressure to said brake cylinder to effect an application of the brakes on said wheels, inertia operated means responsive to the initial slipping of said wheels due to the application of the brakes for effecting a release of fluid under pressure from said brake cylinder at a rate sufficiently rapid to arrest the wheel slipping condition and thus permit the wheels to increase in speed toward that corresponding to vehicle speed, means operable in response to the return of said slipping wheels toward the speed corresponding to vehicle speed for effecting a resupply of fluid under pressure to said brake cylinder, and means for causing the degree of brake cylinder pressure established by said resupply to not exceed a value which bears a fixed ratio to the initial brake cylinder pressure which produced the wheel slipping.

4. In a vehicle brake system, in combination, a brake cylinder for operating the brakes on vehicle wheels, means for effecting a supply of fluid under pressure to said brake cylinder to effect an application of the brakes on said wheels, inertia means having an element shiftable to a first relative position in response to slipping of said vehicle wheels and shiftable to a second relative position when the wheel slipping condition has been arrested and said wheels are increasing in speed toward that corresponding to vehicle speed, means responsive to shifting of said element to said first position for effecting a release of fluid under pressure from said brake cylinder at a rate sufficiently rapid to arrest the wheel slipping condition, and means operative in response to return of said element to the normal position thereof following shifting of said element to said second position for effecting a resupply of fluid under pressure to said brake cylinder, and means for limiting the degree of said resupply to a value which is lower than and bears a fixed ratio to the initial brake cylinder pressure which produced the wheel slipping condition.

5. In a vehicle brake system, in combination, valve means operatively responsive to the same degree of fluid pressure for effecting an application of the brakes to either of two different degrees, means operative when initially effecting an application of the brakes for causing said valve means to effect the application to one of said two degrees, means responsive to an incipient stage of wheel slipping for effecting the operation of said valve means to release the brakes on the slipping wheels at a rate sufficiently rapid to arrest the wheel slipping condition, and thus permit the slipping wheels to return toward a speed corresponding to vehicle speed, and means operative as said slipping wheels approach a speed corresponding to vehicle speed for effecting the operation of said valve means to reapply the brakes on said slipping wheels to the other of said two degrees.

6. In a vehicle brake system, in combination, a brake cylinder, valve means for controlling the supply of fluid under pressure to and its release from said brake cylinder, and operative to establish two different degrees of brake cylinder pressure in response to a given operating pressure, said two degrees bearing a fixed ratio to one another, means for initially effecting the operation of said valve means to effect a supply of fluid under pressure to said brake cylinder to the higher of said two degrees, and means responsive to a wheel slipping condition for effecting the operation of said valve means to release fluid under pressure from said brake cylinder and to then effect the operation of said valve means to reestablish brake cylinder pressure to the lower of said two degrees.

7. In a vehicle brake system, in combination, a brake cylinder, a brake controlling valve device having a plurality of chambers and operable upon supply of fluid under pressure to all of said chambers to effect a supply of fluid under pressure to said brake cylinder to a chosen degree, and operable upon supply of fluid under pressure to less than all of said chambers to effect a supply of fluid under pressure to said brake cylinder to a lower degree, means operative when initiating an application of the brakes to effect a supply of fluid under pressure to all of said chambers, means responsive to a wheel slipping condition for effecting a release of fluid under pressure from all of said chambers, to effect a release of fluid under pressure from said brake cylinder, and means operative following relief of said wheel slipping condition for effecting a supply of fluid under pressure to less than all of said chambers.

8. In a vehicle brake system, in combination, a brake cylinder, a valve device having two chambers and operable upon supply of fluid at a certain pressure to both of said chambers to effect a supply of fluid under pressure to said brake cylinder to a chosen degree, and operable upon supply of fluid at the said certain pressure to a certain one only of said chambers to effect a supply of fluid under pressure to said brake cylinder to a degree lower than said chosen degree, means operable when initiating an application of the brakes for effecting a supply of fluid under pressure to both of said chambers, means responsive to an incipient stage of wheel slipping for effecting a release of fluid under pressure from both of said chambers to effect a release of fluid under pressure from said brake cylinder, and means operative following relief of the wheel slipping condition for effecting a supply of fluid under pressure to said certain one only of said chambers, to effect a resupply of fluid under pressure to said brake cylinder to said lower degree.

9. In a vehicle brake system, in combination, a brake controlling valve device having a plurality of chambers and operable to control the degree of application of the brakes according to the presence or absence of pressure in one or more of said chambers, electroresponsive valve means for controlling the supply of fluid under pressure to and its release from one of said chambers, a second electroresponsive valve means for controlling the supply of fluid under pressure to and its release from other of said chambers, and inertia means for controlling both of said electroresponsive valve means and operative in response to slipping of a vehicle wheel for effecting the operation of both of said electroresponsive means to effect the release of fluid under pressure from all of said chambers, and operative following relief of the wheel slipping condition for effecting the operation of one only of said electroresponsive valve means for effecting a resupply of fluid under pressure to less than all of said chambers.

10. In a vehicle brake system, in combination, two magnet valve devices controlling separate communications through which fluid under pressure is supplied to effect an application of the brakes, each of said magnet valve devices being operable when deenergized to hold its associated communication open, and when energized to close its associated communication, inertia means operative at one time to effect the energization of both of said magnet valve devices and at another time to effect the deenergization of both of said magnet valve devices, and means associated with one of said magnet valve devices for preventing deenergization thereof by operation of said inertia means.

11. In a vehicle brake system, in combination, two electroresponsive valve devices controlling separate communications through which fluid under pressure is supplied to effect an application of the brakes, each of said magnet valve devices being operable when energized to close its associated communication and to open a communication through which fluid under pressure is released to effect a release of the brakes at a rapid rate, means operable in response to the slipping of a vehicle wheel for effecting the energization of both of said electroresponsive valve devices, and potentially operative following relief of the wheel slipping condition to effect the deenergization of both of said electroresponsive valve devices, and means associated with one of said magnet valve devices for establishing a holding circuit for that magnet valve device to prevent deenergization thereof by said inertia means.

12. In a vehicle brake system, in combination, a brake controlling valve device having a plurality of chambers to which fluid under pressure is supplied to effect and control an application of the brakes, the degree of the application being less when pressure is absent in one of said chambers than when pressure is present in said chamber, a plurality of electroresponsive valve devices, each of said devices controlling supply of fluid under pressure to and its release from one of said chambers, inertia means for controlling the energization and deenergization of said electroresponsive valve devices, and means operative responsive to operation of one of said electroresponsive valve devices for maintaining that electroresponsive valve device energized at a time when the other of said electroresponsive valve devices is deenergized by said inertia means.

13. In a vehicle brake system, in combination, means for effecting an application of the brakes, a plurality of normally open electrical circuits, an inertia device operable in response to slipping of a vehicle wheel or wheels for effecting closure of said plurality of circuits, means responsive to the closure of said circuits for effecting a release of the brakes at a rate sufficiently rapid to relieve the wheel slipping condition, said inertia device being operative to effect opening of said circuits following relief of the wheel slipping condition, to cause said last mentioned means to effect a reapplication of the brakes, and means for preventing opening of one of said circuits and for thus causing the degree of the reapplication to be less than and to bear a substantially fixed ratio to the initial degree of the application which produced the wheel slipping condition.

14. In a vehicle brake system, in combination, means for effecting an application of the brakes, a plurality of normally open contacts, means responsive to closing of said contacts for effecting a release of the brakes, and subsequently responsive to opening of said contacts for effecting a reapplication of the brakes, inertia means operative for one rotative condition of certain vehicle wheels for effecting closing of said contacts and operative for another rotative condition of said wheels for effecting opening of said contacts, and means effective on opening of said contacts for preventing the reapplication of the brakes exceeding a degree which is less than and which bears a fixed ratio to the initial degree of the application.

15. In a vehicle brake system, in combination, a brake cylinder, means for effecting a supply of fluid under pressure to said brake cylinder to effect an application of the brakes, rotary inertia means shiftable relatively forward in response to an incipient stage of wheel slipping and shiftable relatively backward in response to a relief of the wheel slipping condition, means operative when said inertia means is shifted forward for effecting a release of fluid under pressure from said brake cylinder at a rapid rate, and operative when said inertia means is shifted backward for effecting a resupply of fluid under pressure to said brake cylinder, and means for conditioning said last means to limit the degree of the resupply to said brake cylinder to a value which is a substantially fixed percentage of the initial brake cylinder pressure.

16. In a vehicle brake system, in combination, means for effecting application of the brakes, two rotatable bodies, means for causing said bodies to rotate in substantial synchronism with a vehicle wheel when not slipping and for causing relative rotational movement between said bodies when said wheel begins to slip due to application of the brakes, means responsive to said relative rotational movement for effecting a release of the brakes sufficiently rapid to relieve the wheel slipping condition, and operative following relief of the wheel slipping condition to effect a reapplication of the brakes, and means so constructed and arranged as to condition the said last means to limit the reapplication of the brakes to a degree which bears a fixed relationship to the initial degree of application.

17. In a vehicle brake system, in combination, a brake controlling valve device having two movable abutments of unequal effective pressure areas and a plurality of chambers each of which is to one side of each of said abutments, said valve device being operative to effect an application of the brakes to one degree when fluid at a certain pressure is supplied to both of said chambers and to a lower degree when fluid at said certain pressure is supplied only to the chamber adjacent the smaller abutment, means operative when initiating an application of the brakes for effecting a supply of fluid under pressure to both of said chambers, and means operative in response to a wheel slipping condition for releasing fluid under pressure from both of said chambers, and operative upon relief of the wheel slipping condition for effecting a resupply of fluid under pressure only to the chamber adjacent the smaller abutment.

18. In a vehicle brake system, in combination, a brake controlling valve device having two diaphragms of unequal effective pressure areas and a chamber for and to one side of each diaphragm, said valve device being operative upon supply of fluid at a certain pressure to both of said chambers to effect an application of the brakes to one degree and upon supply of fluid at said certain pressure only to the chamber adjacent the smaller of said diaphragms for effecting an application of the brakes to a lower degree, means operative when initiating an application of the brakes for effecting a supply of fluid under pressure to both of said chambers, electroresponsive valve means operative when energized to close communication through which fluid under pressure is supplied to both of said chambers and to open communications through which fluid under pressure is released from both of said chambers at a rapid rate, inertia means responsive to an operating condition for effecting the energization of said electroresponsive valve means to close said supply communication and to open said release communications, and responsive to a change in said operating condition to effect the deenergization of said electroresponsive valve means to reopen said supply communication to one only of said two chambers.

19. In a vehicle brake system, in combination, a brake controlling valve device having two diaphragms of unequal effective pressure areas and a chamber for and to one side of each diaphragm, said valve device being operative upon supply of fluid at a certain pressure to both of said chambers to effect an application of the brakes to one degree and upon supply of fluid at said certain pressure only to the chamber adjacent said smaller diaphragm for effecting an application of the brakes to a lower degree, means operative when initiating an application of the brakes for effecting a supply of fluid under pressure to both of said chambers, electroresponsive valve means operative when energized to close communication through which fluid under pressure is supplied to both of said chambers and to open communications through which fluid under pressure is released from both of said chambers at a rapid rate, inertia means responsive to an operating condition for effecting the energization of said electroresponsive valve means to close said supply communication and to open said release communications, and operative upon a change in said operating condition to energize said electroresponsive valve means to open said supply communication to the chamber adjacent the smaller of said two diaphragms only.

20. In a vehicle brake system, in combination, a brake cylinder, a brake controlling valve device having two movable abutments of different effective pressure areas and a chamber for and to one side of each abutment, said valve device being operative upon supply of fluid at a certain pressure to both of said chambers to effect a supply of fluid under pressure to said brake cylinder to one degree, and operative upon supply of fluid at said certain pressure only to the chamber adjacent the smaller of said two abutments for effecting a supply of fluid under pressure to said brake cylinder to a lower degree, means operative when initiating an application of the brakes for effecting a supply of fluid under pressure to both of said chambers, rotary inertia means having a plurality of normally open contacts, and operative in response to an incipient stage of wheel slipping for closing said contacts, and operative following relief of said wheel slipping condition for effecting opening of said contacts, and electroresponsive valve means operative upon closing of said contacts to effect a release of fluid under pressure from both of said chambers at a rate sufficiently rapid to effect arresting of the wheel slipping condition, and operative upon subsequent opening of said contacts for effecting a resupply of fluid under pressure to the one chamber only adjacent the smaller of said two abutments, whereby brake cylinder pressure is reestablished to a degree lower than the initial degree.

21. In a vehicle brake system, in combination, a brake cylinder, a brake controlling valve device having a plurality of movable abutments of different effective pressure areas and a chamber for and to one side of each of said abutments, means establishing communication to each of said chambers through which fluid under pressure is supplied to initiate an application of the brakes, the degree of the application being a maximum when fluid pressure exists in all of said chambers to a like degree, and being less than maximum when fluid pressure is absent in some of said chambers, electroresponsive valve means controlling each of said communications to said chambers, and operative to release fluid under pressure from said chambers, wheel slip detector means operative in an incipient stage of wheel slipping for effecting the operation of said electroresponsive valve means to release fluid under pressure from all of said chambers at a rate sufficiently rapid to arrest and relieve the wheel slipping condition, and operative following relief of the wheel slipping condition to effect the operation of said electroresponsive valve means to effect a resupply of fluid under pressure to said chambers, and means for preventing resupply of fluid under pressure to one of said chambers whereby to cause the resupply of fluid under pressure to said brake cylinder to be to a degree lower than the initial degree of brake cylinder pressure.

22. In a vehicle brake system, in combination, a brake controlling valve device having two movable abutments of different effective pressure areas and a chamber for and to one side of each of said abutments, said valve device being operable upon supply of fluid at a certain pressure to both of said chambers to effect an application of the brakes to a corresponding degree, and being operable upon supply of fluid at said certain pressure to the chamber adjacent the smaller of said two diaphragms only to effect an application of the brakes to a lower degree, a first magnet valve device controlling a communication through which fluid under pressure is supplied to one of said chambers, a second magnet valve device for controlling a communication through which fluid under pressure is supplied to the other of said chambers, inertia operated means operable in response to a particular operating condition of the vehicle to effect the operation of both of said magnet valve devices to close both of said communications to said supply, and means operated by the magnet valve device controlling communication to the chamber adjacent the larger of said two abutments for preventing the opening of said communication by operation of said inertia means.

23. In a vehicle brake system, in combination, means for effecting an application of the brakes, inertia means having associated therewith normally open contacts and operable in response to an incipient stage of wheel slipping for effecting closing of said contacts, and operable upon arresting the deceleration of the wheel during the slipping condition for effecting the opening of said contacts, means controlled by said contacts and operable upon closing of said contacts for effecting a release of the brakes, and operable upon subsequent opening of said contacts for effecting a reapplication of the brakes, and means associated with said inertia means for causing said contacts to remain closed, during a wheel slipping condition, until the slipping wheels shall have returned to a speed corresponding substantially to vehicle speed.

24. In a vehicle brake system, in combination, means for effecting an application of the brakes, a plurality of magnet valve devices operative when energized simultaneously to effect a rapid release of the brakes, and when subsequently deenergized simultaneously to effect a reapplication of the brakes, the degree of said reapplication being limited to a value less than the initial degree when one of said magnet valve devices is not subsequently deenergized, wheel slip detector means operative during an incipient stage of wheel slipping to effect the energization of all of said magnet valve devices, and operable to effect the deenergization of all of said magnet valve devices following relief of the wheel slipping condition, and means for preventing deenergization of one of said magnet valve devices by said wheel slip detector means following relief of the wheel slipping condition.

25. In a vehicle brake system, in combination, a brake cylinder, a brake controlling valve device having two movable abutments of different effective pressure areas and a chamber for and to one side of each of said two abutments, said valve device being operable to establish a chosen brake cylinder pressure upon supply of fluid at a certain pressure simultaneously to both of said chambers, and being operable to establish a lesser brake cylinder pressure upon supply of fluid at said certain pressure to the one chamber only adjacent the smaller of said two abutments, means for effecting supply of fluid under pressure to both of said chambers to effect an application of the brakes, means responsive to an incipient stage of wheel slipping for effecting a release of fluid under pressure from both of said chambers at a rate sufficiently rapid to arrest the wheel slipping condition before the wheel or wheels commence to slide, said means being operative to effect a resupply of fluid under pressure to the one chamber only adjacent the smaller of said two abutments when the wheel slipping condition has been relieved, and means for causing the resupply to said one chamber to be delayed until the speed of the slipping wheel or wheels corresponds substantially to the speed of non-slipping wheels.

26. In a vehicle brake system, in combination, means for effecting an application of the brakes by either straight air operation or by automatic operation, inertia controlled means responsive to an incipient stage of wheel slipping due to the application of the brakes for effecting a release of the brakes on the slipping wheels at a rate sufficiently rapid to arrest the wheel slipping condition and thus permit them to return to a speed corresponding to vehicle speed, and operative as the slipping wheels increase in speed to effect a reapplication of the brakes, and means controlled by said inertia means for causing the degree of the reapplication to be less than and to bear a fixed ratio to the initial degree of application of the brakes.

27. In a vehicle brake control device, in combination, a first rotatable member, a second rotatable member, each of said members having a recess therein, the recess in one member being complementary to the recess in the other member, an unattached element disposed between said two members and loosely interfitting with the complementary recesses, and being operable to permit relative rotational movement between said members, and causing one of said members to move axially with respect to the other of said members upon said relative rotational movement, and brake control means controlled by said axial movement.

28. In a vehicle control device, in combination, a first rotatable body, a second rotatable body, each of said bodies being provided with a plurality of recesses, the recesses in one of said bodies being complementary to the recesses in the other, a plurality of spherical elements disposed between said two members and in the complementary recesses of said two members, and being operable to permit relative rotational movement between said two members and causing one of said members to move in an axial direction upon said relative rotational movement, resilient means opposing said axial movement, and electric contacts adapted to be operative in response to said axial movement.

29. In a vehicle control device, in combination, a first rotatable body, a second rotatable body having a mass appreciably greater than the mass of said first body, means comprising elements interfitting with recesses in said two bodies for providing for relative rotational movement between said two bodies upon a change in the speed of rotation of one of said bodies, a member movable in an axial direction upon said relative rotational movement, a plurality of normally opened contacts adapted to be sequentially closed upon movement of said axially movable member, a rotatable driving means for driving said first and second members, and means for disengaging said driving means when the rate of speed change of said driving means exceeds a predetermined rate.

30. In a vehicle control device, in combination, a first rotatable body, a second rotatable body, said two bodies having a normal position relative to each other, means providing for movement of said second body forwardly or backwardly of said normal position when it is urged at a greater or lesser speed of rotation than said first body, a third body adapted to be actuated in an axial direction upon movement of said second body away from said normal position in either a forward or backward direction, a plurality of contacts adapted to be operated by said axially movable body, a driving member for driving said first and second bodies, and clutch means for engaging said driving member with said first member and operable to disengage said two members when the rate of speed change of said driving member exceeds a predetermined rate, said first member being adapted to be then driven by said second member by virtue of the energy stored in said second member.

31. In a vehicle control device, in combination, a first rotatable member, a second rotatable member, each of said members being provided with one or more recesses, the recesses in one member being complementary to the recesses in the other member, and a plurality of elements disposed in said recesses between said two elements and providing for relative rotational movement between said two members, and means operable to transmit rotational force from one of said members to the other when said relative rotational movement has taken place, said recesses and elements being so constructed and arranged as to require a definite force for causing said relative rotational movement, and a lesser force to maintain said members relatively displaced.

32. In a vehicle control device, in combination, a first rotatable body, a second rotatable body, means providing a common axis of support for said two bodies, each of said bodies being provided with recesses therein, the recesses in one body being complementary to the recesses in the other body, elements loosely disposed in said recesses between said bodies and providing for relative rotational movement of one of said bodies in either a forward or backward direction, with respect to a normal relative position, one of said bodies being movable in an axial direction upon said relative rotational movement, and the force required to initiate said relative rotational movement of said one body being greater than the force required to maintain the said one body in either its forward or backward position.

33. In a vehicle brake equipment, in combination, means for effecting an application of the brakes including two electroresponsive means effective when simultaneously deenergized to cause one degree of application of the brakes to be produced and when one thereof is deenergized and the other is energized to cause a lesser degree of application of the brakes to be produced, and when both are energized to cause release of the brakes, means effective as long as the rate of rotative retardation of a vehicle wheel does not exceed a certain rate for preventing energization of said electroresponsive means and effective when the rate of rotative retardation of the said wheel exceeds the certain rate for effecting simultaneous energization of said two electroresponsive means, and means effective once the last said means causes energization of said two electroresponsive means, for maintaining one of said electroresponsive means energized independently of deenergization of the other by said last means.

34. In a vehicle brake system, in combination, a brake cylinder, a brake controlling valve mechanism having two chambers, and being operative whenever the first of said chambers is charged with fluid at a given pressure to establish a certain pressure in the brake cylinder, and operative when the second only of said two chambers is charged with fluid at the same given pressure to establish in the brake cylinder a pressure different from the said certain pressure, and two valve devices one of which is effective individually to control the supply of fluid under pressure to and its release from the said second chamber, and operable jointly with the other of said valve devices to control the supply of fluid under pressure to said first chamber, said two valve devices being effective individually to cause the release of fluid under pressure from the said first chamber.

35. In a vehicle brake system, in combination, a brake cylinder, a brake controlling valve mechanism having two chambers, and being operative whenever the first of said chambers is charged with fluid at a given pressure to establish a certain pressure in the brake cylinder, and operative when the second only of said two chambers is charged with fluid at the same given pressure to establish in the brake cylinder a pressure different from the said certain pressure, and two valve devices one of which is effective individually to control the supply of fluid under pressure to and its release from the said second chamber, and operable jointly with the other of said valve devices to control the supply of fluid under pressure to said first chamber, said two valve devices being effective individually to cause the release of fluid under pressure from the said first chamber, and means for controlling said valve devices.

CLYDE C. FARMER.